(12) United States Patent
Fuerst et al.

(10) Patent No.: US 7,624,117 B2
(45) Date of Patent: Nov. 24, 2009

(54) COMPLEX DATA ASSEMBLY IDENTIFIER THESAURUS

(75) Inventors: Karl Fuerst, Wiesloch (DE); Florian Kresser, Lobbach (DE)

(73) Assignee: SAP AG, Walldorf (DE)

( * ) Notice: Subject to any disclaimer, the term of this patent is extended or adjusted under 35 U.S.C. 154(b) by 456 days.

(21) Appl. No.: 11/451,730

(22) Filed: Jun. 12, 2006

(65) Prior Publication Data

US 2007/0288425 A1 Dec. 13, 2007

(51) Int. Cl.
*G06F 7/00* (2006.01)
*G06F 17/30* (2006.01)
(52) U.S. Cl. .......................................... 707/101; 707/2
(58) Field of Classification Search .................. None
See application file for complete search history.

(56) References Cited

U.S. PATENT DOCUMENTS

| | | | | |
|---|---|---|---|---|
| 5,210,870 | A * | 5/1993 | Baum et al. ................... | 707/7 |
| 5,421,007 | A * | 5/1995 | Coleman et al. .............. | 707/7 |
| 5,469,355 | A * | 11/1995 | Tsuzuki ....................... | 704/9 |
| 5,649,221 | A * | 7/1997 | Crawford et al. ............ | 715/234 |
| 6,044,374 | A * | 3/2000 | Nesamoney et al. .......... | 707/10 |
| 6,219,667 | B1 * | 4/2001 | Lu et al. ...................... | 707/9 |
| 6,282,509 | B1 * | 8/2001 | Miyauchi .................... | 704/10 |
| 6,658,423 | B1 * | 12/2003 | Pugh et al. .................. | 707/102 |
| 6,728,696 | B1 * | 4/2004 | Walton ........................ | 707/2 |
| 2002/0188615 | A1 * | 12/2002 | Latarche et al. ............. | 707/102 |
| 2003/0217335 | A1 * | 11/2003 | Chung et al. ................ | 715/514 |
| 2004/0103103 | A1 * | 5/2004 | Kalthoff et al. .............. | 707/100 |
| 2004/0254950 | A1 * | 12/2004 | Musgrove et al. ............ | 707/102 |
| 2005/0021541 | A1 * | 1/2005 | Rangadass et al. ........... | 707/100 |
| 2005/0065947 | A1 * | 3/2005 | He et al. ..................... | 707/100 |
| 2005/0066059 | A1 * | 3/2005 | Zybura et al. ................ | 709/248 |
| 2005/0210372 | A1 * | 9/2005 | Kraft et al. ................... | 715/509 |
| 2005/0235146 | A1 * | 10/2005 | Douceur et al. .............. | 713/165 |
| 2006/0053163 | A1 * | 3/2006 | Liu et al. ..................... | 707/104.1 |
| 2006/0101196 | A1 * | 5/2006 | Urmston et al. .............. | 711/108 |
| 2006/0212473 | A1 * | 9/2006 | Carusi et al. ................. | 707/103 R |
| 2006/0248285 | A1 * | 11/2006 | Petev .......................... | 711/141 |

(Continued)

OTHER PUBLICATIONS

Robert Kahn and Robert Wilensky, "A Framework for distributed digital object services", International Journal on Digital Libraries, 2006, 6(2) p. 115-123, published online Mar. 13, 2006.*

*Primary Examiner*—Neveen Abel Jalil
*Assistant Examiner*—Vei-Chung Liang
(74) *Attorney, Agent, or Firm*—Mintz, Levin, Cohn, Ferris, Glovsky & Popeo, P.C.

(57) ABSTRACT

Systems and techniques for the creation and use of a complex data structure identifier thesaurus. In one aspect, an article comprises one or more machine-readable media storing instructions operable to cause one or more machines to perform operations. The operations include receiving, from a data processing system, a collection of mapping information identifying a first object and a first collection of two or more keys used to identify the first object, determining whether a first key in the first collection is found in a first mapping group of a mapping data store, determining whether second key in the first collection is found in a second mapping group of the mapping data store, and merging the first mapping group and the second mapping group to reflect that objects from the first mapping group and the second mapping group are related.

18 Claims, 6 Drawing Sheets

U.S. PATENT DOCUMENTS

| | | | |
|---|---|---|---|
| 2007/0027671 A1* | 2/2007 | Kanawa | 704/4 |
| 2007/0038659 A1* | 2/2007 | Datar et al. | 707/101 |
| 2007/0083503 A1* | 4/2007 | Saha et al. | 707/5 |
| 2008/0086442 A1* | 4/2008 | Dasdan et al. | 707/1 |

* cited by examiner

COMPLEX DATA ASSEMBLY IDENTIFIER THESAURUS

BACKGROUND

This disclosure relates to systems and techniques for the creation and use of a thesaurus for identifiers of complex data assemblies.

A data assembly is a collection of associated information that is treated as an entity in data processing activities. Data assemblies include complex data structures, as well as abstractions such as data objects that can include information drawn from one or more complex data structures. Hereinafter, for the sake of convenience, the term "complex data structures" includes such abstractions even though the abstractions themselves need not be a single complex data structure.

Complex data structure types, also referred to as "composite data types" and "data types," are assemblies of simple data types. Simple data types, also referred to as "primitive" and "elementary" data types, cannot be broken down into smaller component data types. In general, simple data types are the basic data types that are predefined in a language for authoring machine-readable instructions. Simple data types include, e.g., character, numeric, string, and Boolean data types. Simple types do not have element content and do not carry attributes.

In addition to simple data types, complex data structure types can also include other complex data structures in the assembly. In general, complex data structure types are defined by a user to fit the operational context of a particular set of machine-readable instructions. Example complex data structure types include data objects, records, arrays, tables, and the like. Complex data structure types can be defined by a user who assembles a set of elements, fields, and/or attributes to form a reusable data structure. Each of these has a type and, as discussed above, hierarchical and recursive complex data structure types that are themselves assembled from complex data structure types can be formed.

A data structure identifier, or a "key," is information that identifies a complex data structure for data processing activities performed in accordance with a set of machine-readable instructions. The identification is generally unambiguous, i.e., each identifier or key generally refers to a single complex data structure to the exclusion of all other data structures.

A data structure identifier can include, e.g., a name or a value that identifies the object within an identification scheme, a scheme identifier that identifies a frame of reference in which it is possible to identify a data structure, and an agency identifier that identifies the entity that defines the identification scheme and issues names for data structures within the identification scheme.

Different applications, different modules, different data processing systems, different data processing system landscapes, and different public identification scheme entities (such as Dun & Bradstreet, which issues DUNS numbers, and GS1, which issues GTIN's) can use different identification schemes, in which even the same single data structure is referred to using different identifiers.

Moreover, even a single application, module, data processing system, data processing system landscape, and/or public identification scheme entity can use multiple complex data structures of the same semantic type to refer to the same real-world item. Semantic type is a descriptive attribute of information that identifies the behavior (i.e., the semantics) for that information. The semantic type of information can identify the usage and rules for that information to set of a data processing instructions. Two or more objects (or other complex data structures) of the same semantic type can be used to refer to the same single real world entity in one or more sets of data processing activities. For example, a data processing module can include a "product object" instance that includes attributes and values that characterize an instance of a real-world item as a product. The same data processing module can include a "material object" that has the same attributes and values and characterizes the same real-world item, but as a material. Moreover, a second data processing module can include a "design object" that has the same attributes and values and characterizes the same real-world item, but as a design. Even though such objects may refer to the same single real-world entity and share the same semantic type, the various objects may be referred to using different identifiers.

When information regarding a data structure or structures is exchanged, a process called key mapping can be used to translate the different identifiers. In general, key mapping involves accessing a key mapping database where keys used by a first set of processing activities are associated with keys used by a second set of processing activities. When information regarding one or more complex data structures is exchanged, one of the sets of processing activities can access the key mapping database to translate the key from the source processing activities to the key in the second processing activities.

SUMMARY

Systems and techniques for the creation and use of a complex data structure identifier thesaurus are described.

In one aspect, an article comprises one or more machine-readable media storing instructions operable to cause one or more machines to perform operations. The operations include receiving, from a data processing system, a collection of mapping information identifying a first object and a first collection of two or more keys used to identify the first object, determining whether a first key in the first collection is found in a first mapping group of a mapping data store, determining whether second key in the first collection is found in a second mapping group of the mapping data store, and merging the first mapping group and the second mapping group to reflect that objects from the first mapping group and the second mapping group are related.

This and other aspects can include one or more of the following features. Each mapping group can include references to two or more related objects. A first of the related objects can be associated with a first collection of one or more keys and a second of the related objects can be associated with a second collection one or more keys. Also, none of the keys in the first collection need be found in the second collection and none of the keys in the second collection need be found in the first collection. The first mapping group and the second mapping group can be merged by forming a merged mapping group.

The first mapping group and the second mapping group can also be merge by eliminating a reference to a first object found in one of the first mapping group and the second mapping group, and associating keys that were associated with the eliminated first object with an object in the merged mapping group. The merging of the first mapping group and the second mapping group can also include storing, outside of any mapping group, at least one of a reference to the first object or a reference an object from one of the first mapping group and the second mapping group.

The operations can also include receiving, from a second data processing system, a second collection of mapping information that identifies a second object and a second collection of two or more keys used to identify the second object, determining that the second object is related to the object reference stored outside of any mapping group, and creating a new mapping group that includes the second object and the object reference that was stored outside of any mapping group. The operations can also include adding a key from the first collection to a collection of keys in the mapping data store and/or mapping keys using the mapping data store. Keys can be mapped by mapping keys associated with multiple objects in the same mapping group to each other and/or by mapping keys associated with a single object.

In another aspect, an article includes one or more machine-readable media storing instructions operable to cause one or more machines to perform operations. The operations can include receiving, from a data processing system, a collection of mapping information that identifies a first object and a first collection of two or more keys used to identify the first object, determining that none of the keys in the first collection are found in any mapping group of a mapping data store and that the first object is not related to any object found in any mapping group of the mapping data store, determining that a related object that is associated with a second collection of keys exists outside of any mapping group of the mapping data store, wherein the related object is related to the first object in that the related object includes same attributes as the first object and wherein none of the keys in the first collection are found in the second collection and none of the keys in the second collection are found in the first collection, and creating a new mapping group to include the related object and the first object.

This and other aspects can include one or more of the following features. The new mapping group can be created by adding the related object in association with the keys in the second collection to the new mapping group. The operations can also include receiving a second collection of mapping information that identifies the first object and a third collection of two or more keys and associating the first key with the first object in the new mapping group. This can be done when a first key in the third collection can be different from any of the keys in the first collection. The operations can also include receiving a second collection of mapping information that identifies an object and a third collection of two or more keys and eliminating the new mapping group. This can be done when one of the keys in the third collection can be found in the first collection and another of the keys in the third collection can be found in the second collection.

The new mapping group can be eliminated by storing a reference to at least one of the object, the first object, and the related object outside any mapping group in the data store. The operations can also include receiving a second collection of mapping information that identifies an object and a third collection of two or more keys and merging the new mapping group and the second mapping group. This can be done when one of the keys in the third collection can be found in the first collection and another of the keys in the third collection can be found in a second mapping group of the mapping data store. Keys can also be mapped using the mapping data store. For example, keys associated with multiple objects in the same mapping group can be mapped to each other. The mapping data store can include keys stored as core component type identifiers.

In another aspect, a memory for storing data for access by operations performed by one or more data processing systems can include mapping data store. The mapping data store can include a mapping group including references to two or more related objects in different data processing systems using different identification schemes and a reference to an object outside of any mapping group. A first of the related objects can be associated with a first collection of one or more keys and a second of the related objects being associated with a second collection one or more keys. None of the keys in the first collection need be found in the second collection and none of the keys in the second collection need be found in the first collection. The object outside of any mapping group can be associated with a third collection one or more keys. None of the keys in the third collection need be found in the first collection or the second collection and none of the keys in the first collection or the second collection need be found in the third collection. The object outside of any mapping group need not be related to any object in any mapping group. Related objects can be related in that they include same attributes.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
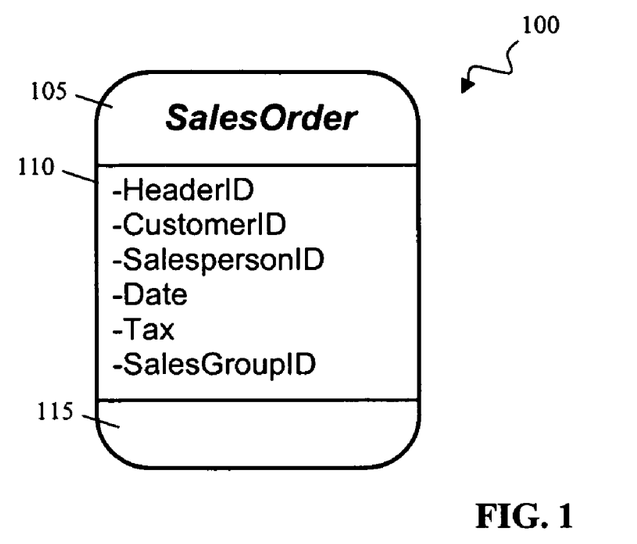
FIG. 1 is a schematic representation of an example complex data structure, namely a data object.

FIG. 1 is a schematic representation of an example complex data structure, namely a data object 100. Data object 100 includes an object class name 105, a collection of attributes 110, and a collection of operations 115. A data object such as data object 100 is a complex data structure that generally assembles information to represent a concrete or abstract real-world entity. An object can be of a certain object class, with individual objects being instances of that class. The entities represented by an object can include, e.g., a set of data processing instructions (such as a program), a data structure (such as a table), individual entries in a data structure (such as a record in a table), a data processing system, a customer, a product, a time, or a location. A data object is generally free of internal references and information stored in a data object can be changed without concomitant changes to the data processing instructions that handle the data object. In some implementations, the information in a data object can be stored in a contiguous block of computer memory of a specific size at a specific location, although this is not necessarily the case.

Object class name 105 is the name of the class of data object 100. For example, data object 100 is of the "SalesOrder" class and represents a sales order entity. Attribute collection 110 includes attributes that are properties of data object 100 and have associated values that characterize the entity represented by data object 100. In particular, the attributes in collection 110 are HeaderID, CustomerID, SalespersonID, Date, Tax, and SalesGroupID. These attributes have values characterizing the sales order represented by data object 100.

Operation collection 115 includes various data processing activities that can be performed on data object 100. The operations in collection 115 can, e.g., return a value or change a value of an attribute in collection 110, in another data object, or the like. The operations in collection 115 can also cause the creation and deletion of objects.

Figure 2:
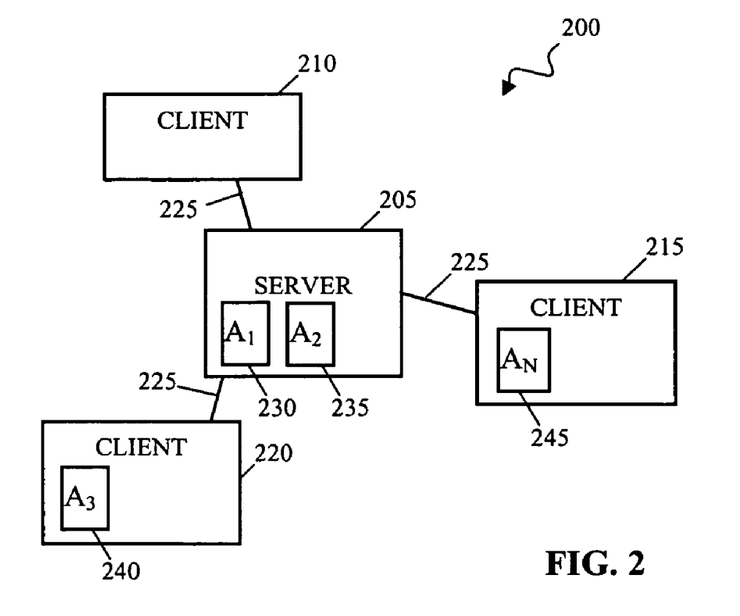
FIGS. 2 and 3 are schematic diagrams of example data processing system landscapes.

FIG. 2 is a schematic representation of a distributed data processing system landscape 200. A distributed data processing system landscape can include a collection of data processing devices, software, and/or systems (hereinafter "data processing systems") that operate autonomously yet coordinate their operations across data communication links in a network and on individual data processing devices. By operating autonomously, the data processing systems can operate in parallel, handling local workloads of data processing activities. The data communication links allow information regarding the activities, including the results of performance of the activities, to be exchanged between data processing systems. To these ends, many distributed data processing systems include distributed databases and system-wide rules for the exchange of data.

System landscape 200 thus is a collection of data processing systems that exchange information for the performance of one or more data processing activities in accordance with the logic of one or more sets of machine readable instructions. System landscape 200 includes one or more servers 205 that are in communication with a collection of clients 210, 215, 220 over a collection of data links 225.

Server 205 is a data processing system that provides services to clients 210, 215, 120. The services can include, e.g., the provision of data, the provision of instructions for processing data, and/or the results of data processing activities. The services can be provided in response to requests from clients 210, 215, 220.

The services can be provided by server 205 in accordance with the logic of one or more applications 230, 235. An application is a program or group of programs that perform one or more sets of data processing activities. An application can perform data processing activities directly for a user or for another application. Examples of applications include word processors, database programs, Web browsers, development tools, drawing, paint, image editing programs, and communication programs. In the context of enterprise software that is operable to integrate and manage the operations of a company or other enterprise, applications can be allocated to managing product lifecycles, managing customer relationships, managing supply chains, managing master data, managing financial activities, and the like.

Clients 210, 215, 220 are data processing systems that receive services from server 205. Clients 210, 215, 220 can be responsible for other data processing activities, such as managing interaction with human users at their respective locations. For example, client 220 can perform data processing activities in accordance with the logic of an application 240, and client 215 can perform data processing activities in accordance with the logic of an application 245. In these course of these and other data processing activities, clients 110, 115, 120 can generate requests for such services and convey the requests to server 205 over one or more of data links 225.

Data links 225 can form a data communication network such as a LAN, a WAN, or the Internet. System landscape 200 can also include additional data links, including direct links between clients 210, 215, 220 and data links to systems and devices outside landscape 200, such as a communications gateway (not shown). Additional data processing activities, performed in accordance with the logic of additional applications, can be performed at the systems and devices outside landscape 200.

The roles of "server" and "client" can be played by the same individual data processing system in system landscape 200. For example, the data processing system denoted as server 205 may receive certain services from one of clients 210, 215, 220. Thus, a data processing system may be a "server" in the context of a first set of services but a "client" in the context of a second set of services.

Figure 3:
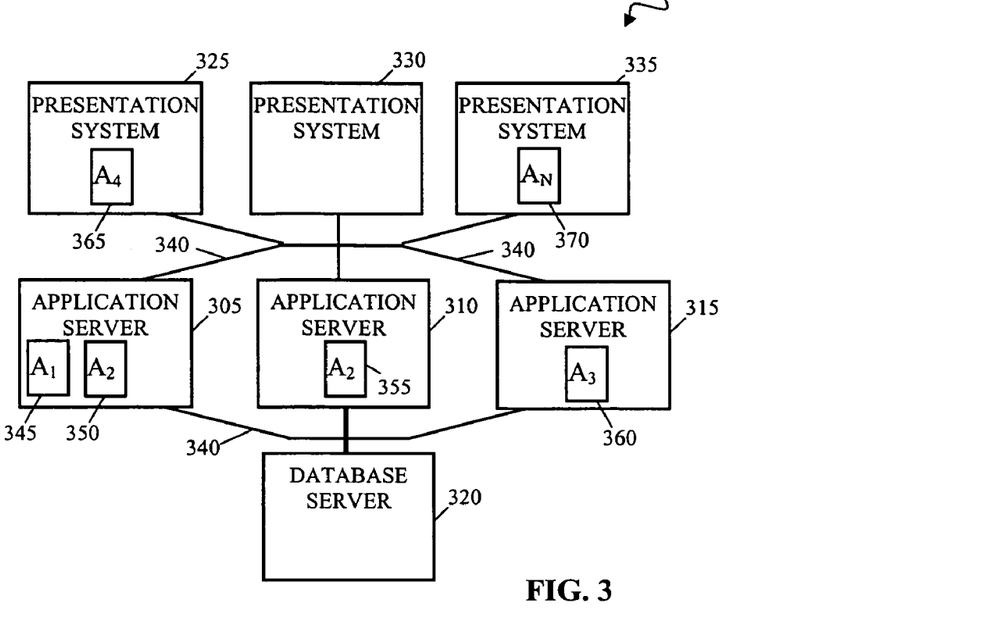

FIG. 3 is a schematic representation of another implementation of a system landscape, namely, a system landscape 300. System landscape 300 is a three tiered hierarchy of data processing systems and includes application servers 305, 310, 315, one or more database servers 320, and presentation systems 325, 330, 335. Application servers 305, 310, 315 and database server 320 are in data communication with each other and with presentation systems 325, 330, 335 over a collection of data links 340.

Application servers 305, 310, 315 are data processing systems that provide services to presentation systems 325, 330, 335 and/or database server 310. Each application server 305, 310, 315 can provide services in accordance with the logic of one or more applications. Moreover, individual application servers can also provide services in accordance with the logic of multiple applications, and services in accordance with the logic of a single application can be provided by multiple application servers. In the illustrated implementation, application server 305 provides services in accordance with the logic of applications 345, 350. Application server 310 provides services in accordance with the logic of application 355. Application server 315 provides services in accordance with the logic of application 360.

Database server 320 is a data processing system that provides storage, organization, retrieval, and presentation of instructions and data services to application servers 305, 310, 315 and/or presentation systems 325, 330, 335.

Presentation systems 325, 330, 335 are data processing systems that receive services from application servers 305, 310, 315 and database server 320 and perform other data processing activities. For example, presentation systems 325, 330, 335 can manage interaction with human users at their respective locations, such as the display of information on a graphical user interface.

In the illustrated implementation, presentation system 325 performs data processing activities in accordance with the logic of an application 365, and presentation system 335 performs data processing activities in accordance with the logic of an application 370. In the course of these and other data processing activities, presentation systems 325, 330, 335 can generate requests for services and convey the requests to application servers 305, 310, 215 and database server 320 over one or more of data links 340.

Figure 4A:
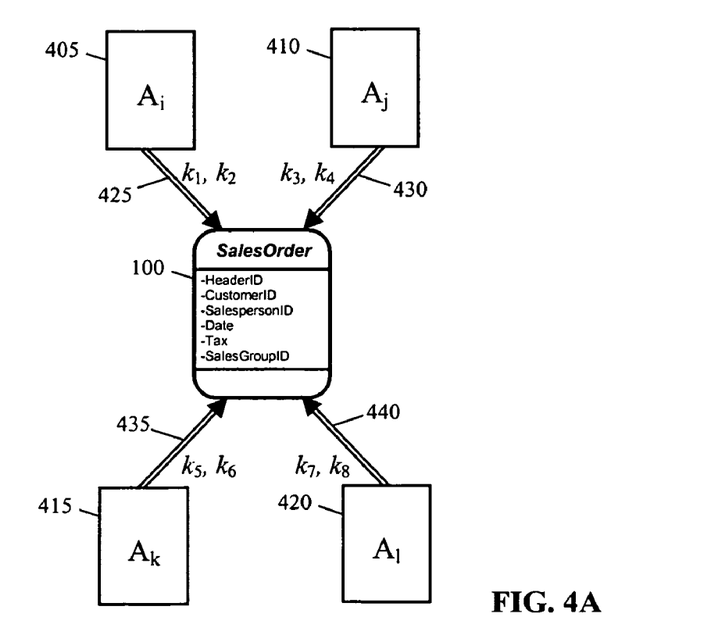
FIGS. 4A and 4B is a schematic representation of how related data objects can be identified using different identifiers.

FIG. 4A is a schematic representation of how data object 100 (FIG. 1) can be identified during different data processing activities using different identifiers. In particular, data processing activities performed in accordance with the logic of applications 405, 410, 415, 420 all identify data object 100 during various identifications, represented by arrows 425, 430, 435, 440. However, the activities of applications 405, 410, 415, 420 use different identifiers to uniquely identify data object 100. In particular, identification 425 uses keys $k_1$ and $k_2$. Identification 430 uses keys $k_3$ and $k_4$. Identification 435 uses keys $k_5$ and $k_6$. Identification 440 uses keys $k_7$ and $k_8$.

The existence of multiple unique keys $k_1, k_2, k_3, k_4, k_5, k_6, k_7, k_8$ for the same data object can arise for any of a number of different reasons. For example, some of keys $k_1, k_2, k_3, k_4, k_5, k_6, k_7, k_8$ can be universally unique ID's (UUID's) that are used internally by data processing activities. Moreover, different UUID's can be assigned by different agents for different identification schemes. Further, some of keys $k_1, k_2, k_3, k_4, k_5, k_6, k_7, k_8$ can be identifiers that are tailored for use by humans. For example, a human user may use a value of an attribute of a data object to uniquely identify the object. For example, a human user may use a key such as "BMW" or "Toyota" to uniquely identify a customer object. Moreover, different human users and different public identification scheme entities may use different identifiers to uniquely identify a data object.

Figure 4B:
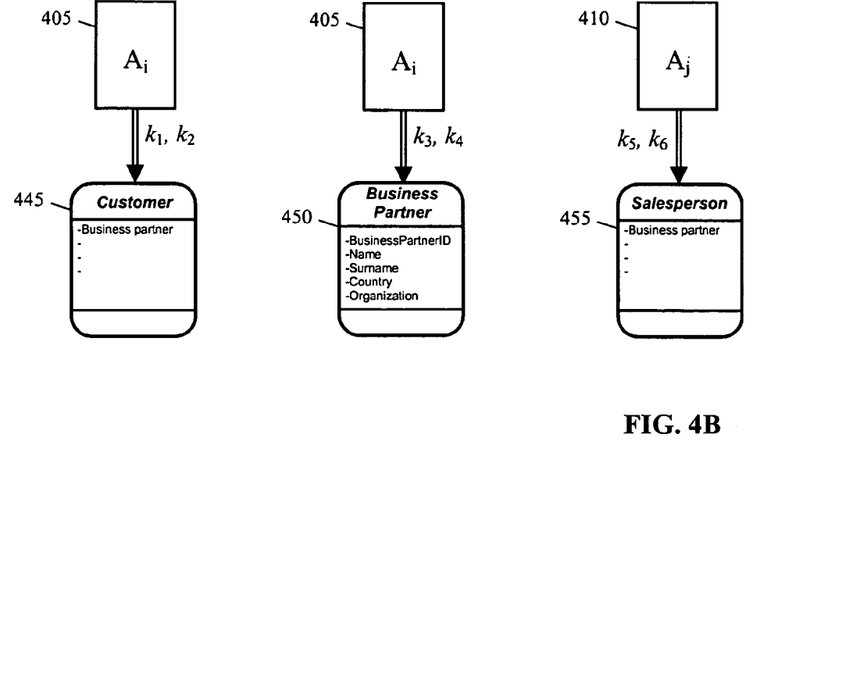

FIG. 4B is a schematic representation of how multiple data objects 445, 450, 455 that describe the same real-world entity can be identified using different identifiers. In particular, data processing activities performed in accordance with the logic of application 405 can identify customer object 445 using keys $k_1$ and $k_2$. Data processing activities performed in accordance with the logic of application 405 can identify business partner object 450 using keys $k_3$ and $k_4$. Data processing activities performed in accordance with the logic of application 410 can identify salesperson object 455 using keys $k_5$ and $k_6$. A single real-world entity is described by data objects 445, 450, 455 and data objects 445, 450, 455 can be of the same semantic type.

Figure 5:
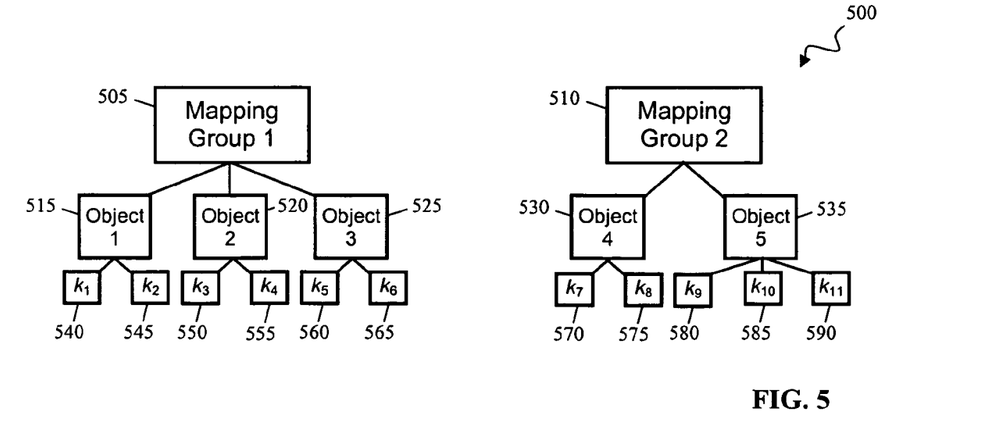
FIG. 5 is a schematic representation of a mapping data store for an object thesaurus.

FIG. 5 is a schematic representation of a mapping data store 500 of an object thesaurus. Mapping data store 500 is a collection of key mapping information that associates the various keys used to identify one or more data objects in one or more data processing systems. For example, the different data processing systems can operate using different identifiers that are issued for different identification schemes by different entities. Moreover, mapping data store 500 can act as a centralized repository for key mapping information from the different data processing systems. For example, the data processing systems whose mapping information is stored at mapping data store 500 need not maintain separate key mapping information. Thus, in some implementations, mapping data store 500 can be a reusable component that provides a consistent view of mapping information to other components. In particular, details regarding data processing instructions associated with mapping data store 500 such as data replication and mapping group merges (as discussed further below) can be hidden from calling components.

Mapping data store 500 can be a structured data collection, such as a table, a record, a data object, a list, or the like. The key mapping information in mapping data store 500 can also be subdivided. For example, key mapping information in mapping data store 500 can be divided and the resulting divisions stored in different data structures. Mapping data store 500 can be stored at a variety of locations in a data processing system landscape. For example, mapping data store 500 can be stored at one or more of server 205 and clients 210, 215, 220 in system landscape 200 (FIG. 2). As another example, mapping data store 500 can be stored at one or more of database server 320, application servers 305, 310, 315, and presentations systems 325, 330, 335 in system landscape 300 (FIG. 4). Mapping data store 500 can also be stored remotely from system landscapes 200, 300 and yet be accessed from system landscapes 200, 300. In some implementations, the storage of a single mapping data store 500 can be distributed across different systems in a system landscape. Mapping data store 500 can be structured into a file, packed, compressed, or otherwise prepared for storage. Mapping data store 500 can also include metadata or executable instructions that are relevant to accessing key mapping information. Examples of metadata include default keys, leading keys, and internal keys. Such metadata can be used internally, i.e., for data processing activities associated with mapping data store 500, and need not be provided to user interfaces.

Mapping data store 500 includes mapping groups 505, 510. A mapping group is a collection of references to related objects. The way in which the objects are related can be defined, e.g., by a user or by a set of data processing activity that accesses mapping data store 500. For example, a user can define a mapping group to include references to the same objects that are involved in different sets of data processing activities that use different identification schemes. The objects in such a mapping group can be identical in that they have the same attributes and values, but are subject to different operations in different data processing systems. As another example, a component set of data processing activities can group similar objects in a mapping group. The objects can be similar in that there is a logical relationship between the objects. Such a logical relationship can be specified, e.g., by the component set of data processing activities in accordance with the logic of those data processing activities. One example of such a logical relationship is that the object describe the same real-world entity.

Mapping group 505 includes references to objects 515, 520, 525. Mapping group 510 includes references to objects 530, 535. Each of objects 515, 520, 525, 530, 535 is associated with one or more keys that are used to uniquely identify objects 515, 520, 525, 530, 535 for the relevant data processing activities. For example, object 515 can be identified using keys 540, 545 during data processing activities performed in accordance with a first set of instructions. Object 520 can be identified using keys 550, 555 during data processing activities performed in accordance with a second set of instructions. Object 525 can be identified using keys 560, 565 during data processing activities performed in accordance with a third set of instructions. Object 530 can be identified using keys 570, 575 during data processing activities performed in accordance with the first set of instructions. Object 535 can be identified using keys 580, 585, 590 during data processing activities performed in accordance with a fourth set of instructions. As shown, the number of keys per object is arbitrary. Moreover, the number of objects in excess of one in each mapping group is arbitrary.

In one implementation, mapping data store 500 is implemented as a storage of a collection of core component type (CCT) identifiers. A core component type identifier can identify a particular business object along with the context in which that identification is valid. For example, in addition to the identifier of the particular object, a CCT identifier can identify one or more of an identification scheme that assigned the identifier, the version of the identification scheme, an agent that administers that identification scheme, the identification scheme of such an agent, and the agent that administers the identification scheme of such an agent.

Figure 6:
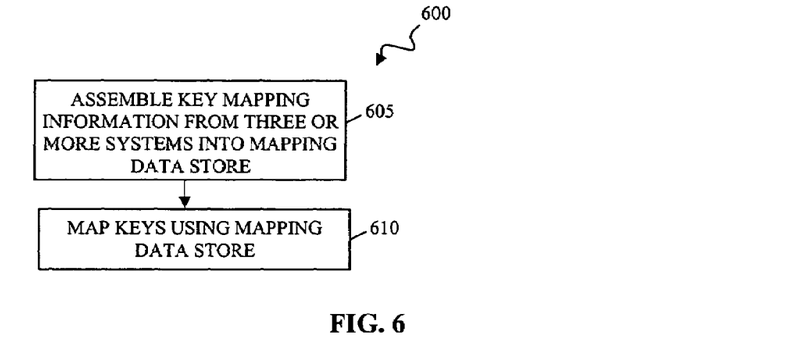
FIG. 6 is a flowchart of a process for the creation and use of a data store of an object thesaurus.

FIG. 6 is a flowchart of a process 600 for the creation and use of a mapping data store of an object thesaurus. Process 600 can be performed by one or more data processing systems that exchange information with one or more data processing systems. For example, one or more data processing systems can perform data processing activities for the creation of the data store for an object thesaurus, and one or more data processing systems can perform data processing activities for the use of the object thesaurus.

The system(s) performing process 600 can assemble key mapping information from three or more data processing systems into a single mapping data store at 605. Such an assembly of key mapping information is more complicated than assembling mapping information from two or fewer data processing systems. For example, as discussed further below, the number and type of mappings is more difficult to define with larger numbers of data processing systems. As another example, increased numbers and different categories of mergers and deletions may be required.

The system(s) performing process 600 can also map the keys using the mapping data store at 610. For example, keys can be mapped between two or more data processing systems using different identification schemes, or keys can be mapped between synchronized systems. The mappings can be performed, e.g., in response to requests received from the data processing systems themselves.

Figure 7:
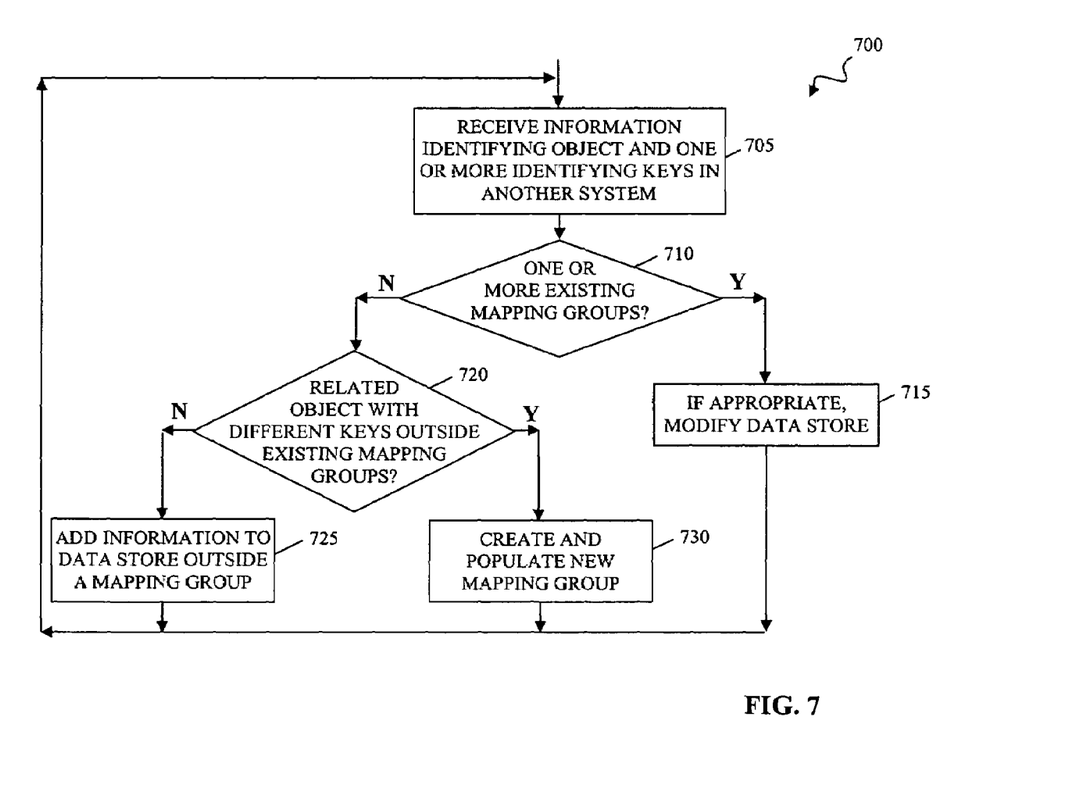
FIG. 7 is a flowchart of a process for the creation of a data store of an object thesaurus.

FIG. 7 is a flowchart of a process 700 for the creation of a data store for an object thesaurus. Process 700 can be performed independently or in conjunction with other data processing activities. For example, process 700 can be performed at 605 in process 600 (FIG. 6).

The system(s) performing process 700 can receive information that identifies a data object and one or more keys for identifying the data object in another data processing system at 705. The information that identifies a data object can itself be a key for identifying the data object. In some implementations, the information can be received directly from the data processing system that uses those keys. For example, the information can be received in a message that includes the keys as CCT identifiers.

The system(s) performing process 700 can determine if the received information appears in one or more existing mapping groups in the data store at 710. The received information appears in an existing mapping group when the object or the keys identified in the information appear in an existing mapping group. The determination can be made by comparing the received information to the contents of the data store. For example, received keys can be compared to existing keys.

If the system(s) performing process 700 determines that the received information does appear in an existing mapping group, then the system(s) can, as appropriate, modify the data store at 715. If the received information is already found in the data store and the data store already accurately reflects the received information, no modifications are necessarily performed. However, if modifications are appropriate, they can include adding some or all of the information to the data store, deleting information from the data store, and/or changing the associations between mapping groups, objects, and keys in the data store. For example, new references to new objects can be added, new keys can be added to existing objects, new mapping groups can be created, and/or existing mapping groups can be merged. Illustrative modifications are discussed further below.

If the system(s) performing process 700 determines that the received information does not appear in an existing mapping group, then the system(s) can determine if there is an object outside of existing mapping groups that has matching keys at 720. The determination can be made by comparing the received information to the contents of the data store that are outside of mapping groups.

If the system(s) performing process 700 determines that there are not any related objects outside of existing mapping groups with different keys, then the system(s) can add the information to a data store outside of any mapping group at 725. The addition can occur in a number of ways. For example, if a related object is found, but with at least some identical keys, any keys from the received information that do not appear in the related object outside of the existing mapping group can be added to the related object outside of the existing mapping group. As another example, if no related object is found, the received object and its keys can be added to the data store outside of any mapping group. In one implementation, this is done by inserting key, object, and group information into the relevant tables of the database.

If the system(s) performing process 700 determines that there are related objects outside of existing mapping groups that have different keys, then the system(s) can create and populate a new mapping group at 730. The new mapping group can be populated with the received information, as well as the related object and its associated keys that were found in the data store but outside of existing mapping groups. Once the new mapping group is populated, the related object outside of existing mapping groups can be deleted from the data store.

After the activities of any of 715, 725, or 730, the system(s) performing process 700 can return to receive additional information that identifies a data object and one or more keys for identifying the data object in another data processing system at 705. Through such repetitions, a data store can be assembled and updated to reflect the current state of two or more data processing systems. Further, the data store can be made available during such repetitions for mapping the keys between systems.

FIGS. 8-13 schematically illustrate various examples of the modification of mapping data store 500 based on mapping information. The illustrated additions, modifications, and similar processes can be performed by one or more data processing systems at 715 in process 700 (FIG. 7).

Figures 8, 9:
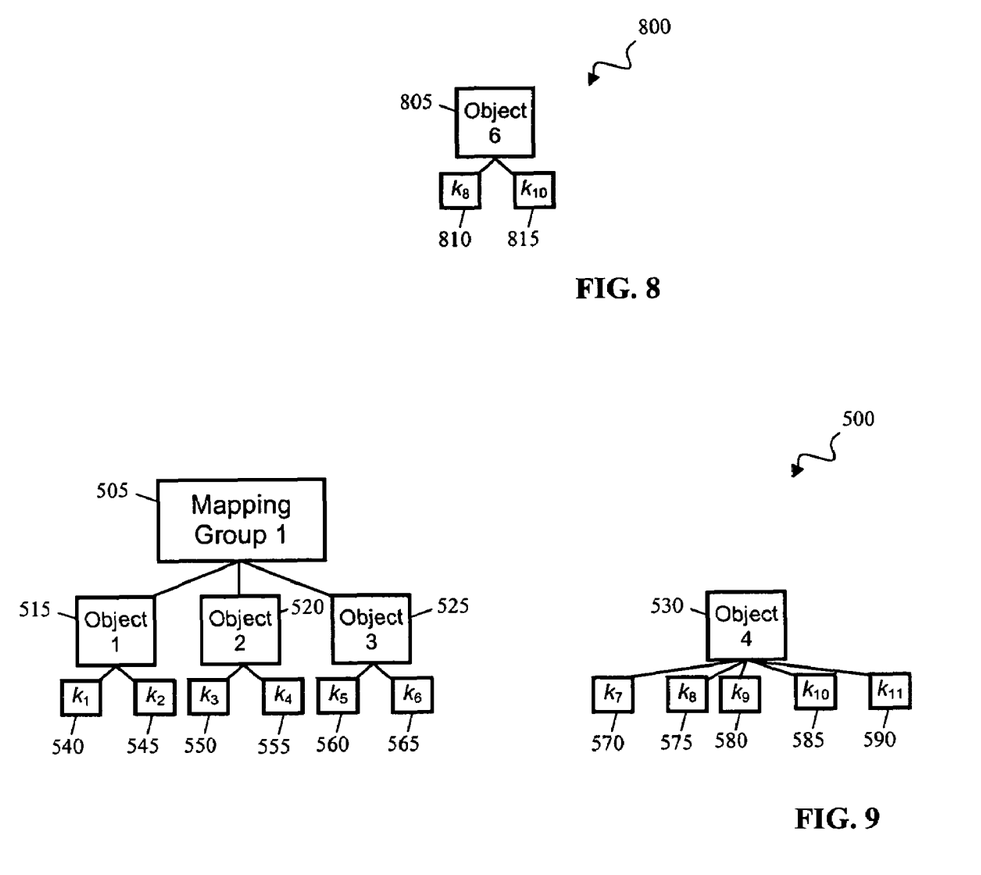
FIGS. 8-13 schematically illustrate various examples of the modification of the mapping data store of FIG. 5 based on mapping information.

FIG. 8 is a schematic representation of information 800 that can be received by a system performing process 700 at 705 (FIG. 7). Information 800 identifies an object 805 and keys 810, 815 for identifying object 805 in a data processing system.

Keys 810, 815 can be identified as identical to keys identified in one or more existing mapping groups in a data store. For example, key 810 can be identified as identical to key 575 in mapping group 510 in mapping data store 500, and key 815 can be identified as identical to key 585 in mapping group 510 in mapping data store 500.

FIG. 9 is a schematic representation of mapping store 500 after modification in light of information 800 (FIG. 8). In particular, mapping group 510 and object 535 have been eliminated to reflect that objects 530, 535 are mapped to each other. For example, the elimination of mapping group 510 and object 535 can reflect that objects 530, 535 are related objects or even the same object. Also, object 530 has been associated with keys 580, 585, 590 and is now stored in mapping data store 500 outside of a mapping group. Although object 530 and keys 570, 575, 580, 585, 590 are not applicable to mapping between objects in different data processing systems since object 530 exists in a single system, the information embodied in object 530 and keys 570, 575, 580, 585, 590 is still useful. For example, object 530 and keys 570, 575, 580, 585, 590 can be used for key mapping within a single system or between synchronized systems. As another example, object 530 and keys 570, 575, 580, 585, 590 stand ready for the creation and population of a new mapping group when objects and keys from different data processing systems are received.

Figure 10:
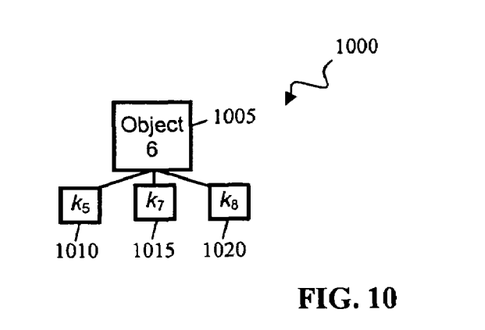

FIG. 10 is a schematic representation of information 1000 that can be received by a system performing process 700 at 705 (FIG. 7). Information 1000 identifies an object 1005 and keys 1010, 1015, 1020 for identifying object 1005 in a data processing system.

Keys 1010, 1015, 1020 can be identified as identical to keys identified in one or more existing mapping groups in a data store. For example, key 1010 can be identified as identical to key 560 in mapping group 505 in mapping data store 500, key 1015 can be identified as identical to key 570 in mapping group 510 in mapping data store 500, and key 1020 can be identified as identical to key 575 in mapping group 510 in mapping data store 500.

Figure 11:
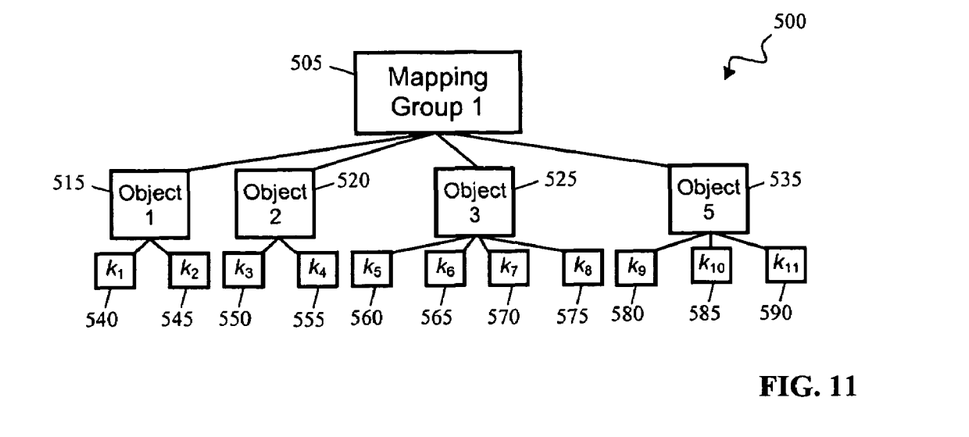

FIG. 11 is a schematic representation of mapping store 500 after modification in light of information 1000 (FIG. 10). In particular, mapping group 510 and object 530 have been eliminated and object 535 has been added to mapping group 505 to reflect that objects 525, 530 were not only related but also in the same data processing system. The addition of object 535 to mapping group 505 is also based on a prior identification of object 535 as related to object 530. Also, object 525 has been associated with keys 560, 565, 570, 575.

Figure 12:
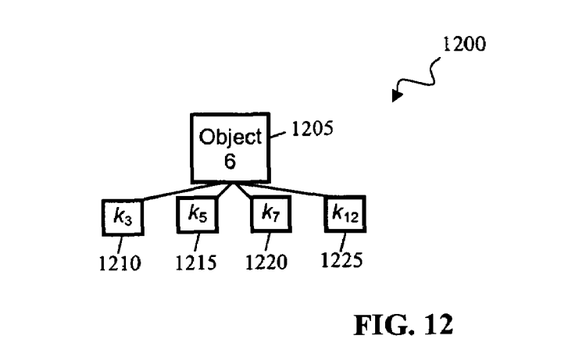

FIG. 12 is a schematic representation of information 1200 that can be received by a system performing process 700 at 705 (FIG. 7). Information 1200 identifies an object 1205 and keys 1210, 1215, 1220, 1225 for identifying object 1205 in a data processing system.

Keys 1210, 1215, 1220 can be identified as identical to keys identified in an existing mapping group in a data store. For example, key 1210 can be identified as identical to key 550 in mapping group 505 in mapping data store 500, key 1215 can be identified as identical to key 560 in mapping group 505 in mapping data store 500, and key 1220 can be identified as identical to key 570 in mapping group 510 in mapping data store 500. Key 1225 does not appear in mapping data store 500 before information 1200 is received.

Figure 13:
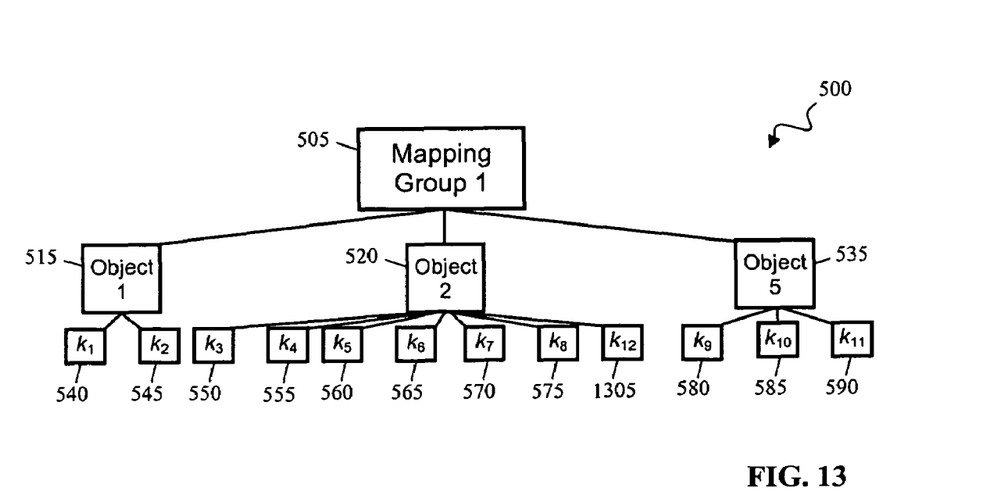

FIG. 13 is a schematic representation of mapping data store 500 after modification in light of information 1200 and after addition of some of information 1200 (FIG. 12). In particular, mapping group 510 and objects 525, 530 have been eliminated and object 535 has been added to mapping group 505 to reflect that objects 520, 525, 530 were not only related but also in the same data processing system. The addition of object 535 to mapping group 505 is also based on a prior identification of object 535 as related to object 530. Also, object 520 has been associated with keys 560, 565, 570, 575, and newly added key 1305. Key 1305 has been newly added on the basis of its prior absence from mapping data store 500.

Keys can be mapped using the mapping information stored in a mapping data store in a variety of different scenarios. For example, keys can be mapped when master data is distributed between harmonized data processing systems. Harmonized systems are systems which share at least one common identifier for data objects involved in data processing activities in those systems. Master data is information that is stored on a relatively long-term basis in one or more data processing systems and is often relevant to multiple processes in those systems. In the illustrative mapping data store 500 described above, keys to master data objects in such harmonized data processing systems will be associated with multiple objects in the same mapping group provided that the systems are synchronized as to those objects.

Keys can also be mapped when transactional data objects are distributed between harmonized data processing systems. Transactional data is information that records events occurring between individuals, groups, and organizations. Transactional data is generally created more frequently, and can be modified more often, than master data. In the illustrative mapping data store 500 described above, keys to transactional data objects in such harmonized data processing systems will be associated with multiple objects in the same mapping group provided that the systems are synchronized as to those objects.

Keys can also be mapped during synchronous access from one data processing system to another harmonized data processing system. Synchronous access can include a first data processing system reading of data directly from and writing data directly to a second data processing system. In the illustrative mapping data store 500 described above, keys for synchronous access in such harmonized data processing systems will be associated with multiple objects in the same mapping group provided that the systems are synchronized as to those objects.

Keys can also be mapped during translation of external identifiers. External identifiers are identifiers used by another data processing system landscape. For example, external identifiers can be included in messages and other information received from remote systems. In the illustrative mapping data store 500 described above, keys for the translation of external identifiers will be associated with the same single object, provided that the multiple identifiers of that single object have previously been identified to the mapping data store 500 as identifying the same object.

Keys can also be mapped during translation of incompatible sets of machine-readable instructions in the same data processing system landscape. Example incompatible sets of machine-readable instructions include unharmonized applications in the same data processing system landscape. In the illustrative mapping data store 500 described above, keys for translation between incompatible sets of machine-readable instructions will be associated with the same single object, provided that the multiple identifiers of that single object have previously been identified to the mapping data store 500 as identifying the same object.

A complex data structure thesaurus, such as data store 500, can be also used in contexts outside of key mapping. For example, a complex data structure thesaurus can be used for object-based navigation. Object-based navigation is a navigation style based upon the characteristics at the object level, i.e., the contents of the objects and the relationship among the objects. With object-based navigation, users can specify a set of objects and their relationship. The system creates queries from the users' input and determines links dynamically based on matching between this query and indices.

As another example, a complex data structure thesaurus can be used to identify data processing systems that use certain objects and/or identifiers. Such "where-used" checks can be used, e.g., for a corporate wide reporting of purchasing costs of a single product to identify if centralized "buying in bulk" can be used to lower the cost of that product.

As another example, a complex data structure thesaurus can be used in global searches and central searches with downstream identification translation. Such searches located objects by the attributes of a central object and then determine the identifier of the local representation.

A number of implementations have been described. Nevertheless, it will be understood that various modifications may be made. Accordingly, other implementations are within the scope of the following claims.

What is claimed is:

1. An article comprising one or more machine-readable storage media storing instructions configured to cause one or more machines to perform operations, the operations comprising:

receiving, from a data processing system, a collection of mapping information identifying a first object and a first collection of two or more keys used to identify the first object, each object including an object class name, a collection of attributes, and a collection of operations, each key referring to the first object to the exclusion of all other objects;

determining that a first key in the first collection is found in a first mapping group of a mapping data store, the first mapping group comprising a second collection of two or more keys and containing mapping information that associates the corresponding keys with two or more data objects;

determining that a second key in the first collection is found in a second mapping group of the mapping data store, the second mapping group comprising a third collection of two or more keys and containing mapping information that associates the corresponding keys with two or more data objects; and merging the first mapping group and the second mapping group to reflect that objects from the first mapping group and the second mapping group are related such that the first key and the second key are mapped to the same object, wherein none of the associated data objects in the first mapping data store are found in the second mapping data store and none of the associated data objects in the second mapping data store are found in the first mapping data store.

2. The article of claim 1, wherein merging the first mapping group and the second mapping group comprises forming a merged mapping group.

3. The article of claim 2, wherein merging the first mapping group and the second mapping group comprises:
eliminating a reference to a first object found in one of the first mapping group and the second mapping group; and
associating keys that were associated with the eliminated first object with an object in the merged mapping group.

4. The article of claim 1, wherein merging the first mapping group and the second mapping group comprises storing, outside of any mapping group, at least one of a reference to the first object or a reference an object from one of the first mapping group and the second mapping group.

5. The article of claim 4, wherein the operations further comprise:
receiving, from a second data processing system, a second collection of mapping information that identifies a second object and a second collection of two or more keys used to identify the second object;
determining that the second object is related to the object reference stored outside of any mapping group; and
creating a new mapping group that includes the second object and the object reference that was stored outside of any mapping group.

6. The article of claim 4, wherein the operations further comprise mapping keys using the mapping data store.

7. The article of claim 6, wherein mapping keys comprises mapping keys associated with multiple objects in the same mapping group to each other.

8. The article of claim 6, wherein mapping keys comprises mapping keys associated with a single object.

9. The article of claim 1, wherein the operations further comprises adding a key from the first collection to a collection of keys in the mapping data store.

10. An article comprising one or more machine-readable storage media storing instructions configured to cause one or more machines to perform operations, the operations comprising:

receiving, from a data processing system, a collection of mapping information that identifies a first object and a first collection of two or more keys used to identify the first object, each object including an object class name, a collection of attributes, and a collection of operations, each key referring to a corresponding object to the exclusion of all other objects;

determining that none of the keys in the first collection are found in any mapping group of a mapping data store and that the first object is not related to any object found in any mapping group of the mapping data store, each mapping group comprising a second collection of two or more keys and containing mapping information that associates the corresponding kegs with two or more data objects;

determining that a related object that is associated with a second collection of keys exists outside of any mapping group of the mapping data store, wherein the related object is related to the first object in that the related object includes same attributes as the first object and wherein none of the keys in the first collection are found in the second collection and none of the keys in the second collection are found in the first collection; and creating a new mapping group to include the related object and the first object, wherein creating the new mapping group comprises adding the related object in association with the keys in the second collection to the new mapping group.

11. The article of claim 10, wherein the operations further comprise:
receiving a second collection of mapping information that identifies the first object and a third collection of two or more keys, wherein a first key in the third collection is different from any of the keys in the first collection; and
associating the first key with the first object in the new mapping group.

12. The article of claim 10, wherein the operations further comprise:
receiving a second collection of mapping information that identifies an object and a third collection of two or more keys, wherein one of the keys in the third collection is found in the first collection and another of the keys in the third collection is found in the second collection; and
eliminating the new mapping group.

13. The article of claim 12, wherein eliminating the new mapping group comprises storing a reference to at least one of the object, the first object, and the related object outside any mapping group in the data store.

14. The article of claim 10, wherein the operations further comprise:
receiving a second collection of mapping information that identifies an object and a third collection of two or more keys, wherein one of the keys in the third collection is found in the first collection and another of the keys in the third collection is found in a second mapping group of the mapping data store; and
merging the new mapping group and the second mapping group.

15. The article of claim 10, wherein the operations further comprise mapping keys using the mapping data store.

16. The article of claim 15, wherein mapping keys comprises mapping keys associated with multiple objects in the same mapping group to each other.

17. The article of claim 10, wherein the mapping data store comprises keys stored as core component type identifiers.

18. A method implemented by one or more data processors, the method comprising:

receiving, by at least one data processor from a data processing system, a collection of mapping information identifying a first object and a first collection of two or more keys used to identify the first object, each object including an object class name, a collection of attributes, and a collection of operations, each key referring to the first object to the exclusion of all other objects;

determining, by at least one data processor, that a first key in the first collection is found in a first mapping group of a mapping data store, the first mapping group comprising a second collection of two or more keys and containing mapping information that associates the corresponding keys with two or more data objects;

determining, by at least one data processor, that a second key in the first collection is found in a second mapping group of the mapping data store, the second mapping group comprising a third collection of two or more keys and containing mapping information that associates the corresponding keys with two or more data objects; and merging, by at least one data processor, the first mapping group and the second mapping group to reflect that objects from the first mapping group and the second mapping group are related such that the first key and the second key are mapped to the same object, wherein none of the associated data objects in the first mapping data store are found in the second mapping data store and none of the associated data objects in the second mapping data store are found in the first mapping data store.

* * * * *

UNITED STATES PATENT AND TRADEMARK OFFICE
CERTIFICATE OF CORRECTION

PATENT NO.       : 7,624,117 B2
APPLICATION NO.  : 11/451730
DATED            : November 24, 2009
INVENTOR(S)      : Fuerst et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this

Twenty-sixth Day of October, 2010

David J. Kappos
*Director of the United States Patent and Trademark Office*